United States Patent
Nitao

(10) Patent No.: US 9,859,064 B2
(45) Date of Patent: Jan. 2, 2018

(54) METHOD FOR PRODUCING ACTIVATED CARBON SHEET AND METHOD FOR IMPROVING IMPREGNATION OF ACTIVATED CARBON SHEET WITH ELECTROLYTE SOLUTION

(71) Applicant: Nippon Valqua Industries, Ltd., Tokyo (JP)

(72) Inventor: Akimasa Nitao, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 14/769,830

(22) PCT Filed: Feb. 19, 2014

(86) PCT No.: PCT/JP2014/053928
§ 371 (c)(1),
(2) Date: Aug. 24, 2015

(87) PCT Pub. No.: WO2014/132862
PCT Pub. Date: Sep. 4, 2014

(65) Prior Publication Data
US 2016/0005550 A1    Jan. 7, 2016

(30) Foreign Application Priority Data
Feb. 26, 2013    (JP) .................................. 2013-035848

(51) Int. Cl.
| | | |
|---|---|---|
| H01B 1/24 | (2006.01) | |
| H01G 11/34 | (2013.01) | |
| H01G 11/86 | (2013.01) | |
| H01G 11/38 | (2013.01) | |
| H01G 11/32 | (2013.01) | |

(52) U.S. Cl.
CPC ............... *H01G 11/34* (2013.01); *H01B 1/24* (2013.01); *H01G 11/38* (2013.01); *H01G 11/86* (2013.01); *H01G 11/32* (2013.01); *Y02E 60/13* (2013.01)

(58) Field of Classification Search
CPC ........ H01G 11/32; H01G 11/34; H01G 11/38; H01G 11/86; Y02E 60/13; H01B 1/24
See application file for complete search history.

(56) References Cited

U.S. PATENT DOCUMENTS

| | | |
|---|---|---|
| 6,944,010 B1 | 9/2005 | Paul et al. |
| 2004/0170821 A1* | 9/2004 | Iwaida ................... H01G 11/38 428/323 |
| 2007/0008677 A1 | 1/2007 | Zhong et al. |
| 2008/0028583 A1* | 2/2008 | Shimoyama ........... H01G 9/058 29/25.03 |
| 2011/0081575 A1 | 4/2011 | Voelker et al. |
| 2015/0062779 A1* | 3/2015 | Bankaitis ............... H01G 11/32 361/502 |

FOREIGN PATENT DOCUMENTS

| | | | |
|---|---|---|---|
| CN | 1617273 A | 5/2005 | |
| CN | 102742047 A | 10/2012 | |
| JP | S60149114 A | 8/1985 | |
| JP | 04-047449 | 2/1992 | |
| JP | 09-129516 | 5/1997 | |
| JP | 11097310 | 4/1999 | |
| JP | 2000182436 | 6/2000 | |
| JP | 2002-237434 | 8/2002 | |
| JP | 2002237434 A * | 8/2002 | ............. H01G 11/32 |
| JP | 2003-508906 A | 3/2003 | |
| JP | 2004-002105 | 1/2004 | |
| JP | 2008-205275 | 9/2008 | |
| JP | 2013-030694 | 2/2013 | |

OTHER PUBLICATIONS

Girardeaux, C. et al., "Etching and functionalization of a fluorocarbon polymer by UV laser treatment", Applied Surface Science, 1996, pp. 586-590, vol. 96-98, Elsevier Science B.V.

Qin, Zongyi, et al., "Enhanced sensing performance of the amperometric gas sensor by laser-patterning of the polymer membrane electrode", Sensors and Actuators, 2005, pp. 805-811, vol. 107, Elsevier B.V.

* cited by examiner

*Primary Examiner* — Jaison P Thomas
(74) *Attorney, Agent, or Firm* — The Webb Law Firm

(57) ABSTRACT

A method for producing an activated carbon sheet having high electrolyte impregnation capacity and high mechanical strength is provided. The method for producing an activated carbon sheet includes a sheet preparation step of preparing a sheet including an activated carbon, an electrically conductive carbon material, and a fibrous fluorocarbon resin binder, which fluorocarbon resin is polytetrafluoroethylene and/or modified polytetrafluoroethylene; and a light irradiation step of performing light irradiation of at least one side of the sheet such that the cumulative irradiation dose on the sheet surface is 50 to 1000 mJ/cm².

12 Claims, No Drawings

METHOD FOR PRODUCING ACTIVATED CARBON SHEET AND METHOD FOR IMPROVING IMPREGNATION OF ACTIVATED CARBON SHEET WITH ELECTROLYTE SOLUTION

CROSS-REFERENCE TO RELATED APPLICATIONS

This application is the United States national phase of International Application No. PCT/JP2014/053928 filed Feb. 19, 2014, and claims priority to Japanese Patent Application No. 2013-035848 filed Feb. 26, 2013, the disclosures of which are hereby incorporated in their entirety by reference.

TECHNICAL FIELD

The present invention relates to a method for producing an activated carbon sheet such as an electrode for an electric double layer capacitor, and a method for improving the electrolyte impregnation capacity of an activated carbon sheet such as an electrode for an electric double layer capacitor.

BACKGROUND ART

An electric double layer capacitor (hereinafter referred to as "EDLC") is a condenser utilizing physical accumulation of charge based on an electric double layer, and has a number of advantages over chemical-reaction-based secondary batteries, such as an ability of high-output quick charge/discharge, and non-polluting properties. It is expected that electric double layer capacitors will be applicable to various uses, including use of compact electric double layer capacitors for electronic devices, and use of large electric double layer capacitors in automobile batteries. An electrode film for an EDLC is usually comprises a powder electrode such as an activated carbon; an electrically conductive material; a binder such as a fluorocarbon resin; and the like (e.g., JP 2004-2105 A).

The performance of an EDLC is influenced by the amount of an electrolyte impregnated in this electrode film. JP 4-47449 B describes destroying of the surface of a sheet-like electrode, especially a dense and smooth layer containing a large amount of a tetrafluoroethylene resin (polytetrafluoroethylene; hereinafter referred to as "PTFE"), to provide the surface of the sheet-like electrode with flaws in order to improve the electrolyte impregnation capacity of the sheet-like electrode.

However, use of this technique may cause the sheet-like electrode to be destroyed, leading to powder falling from the sheet-like electrode and shape changes (thickness, density, and the like), resulting in deterioration of the electric stability of the sheet-like electrode or an EDLC using the sheet-like electrode.

On the other hand, there is a known technique in which an electrode film for an EDLC is irradiated with an electromagnetic wave to improve its properties. For example, JP 2008-205275 A describes that, by irradiating an activated carbon as a material for an EDLC electrode with an electromagnetic wave in an atmosphere of hydrogen or the like, an oxygen-containing functional group present on the surface of the activated carbon is released, and that the thus produced material for an EDLC electrode can be used for production of a high-capacity EDLC having stable performance.

JP 2002-237434 A describes a technique in which, in order to solve problems caused by attachment, in a layer-forming manner, of a binder such as PVDF on the surface of an activated carbon during production of an electrode body, an electrode functional material prepared by kneading a powder electrode material, a binder, and a solvent is applied to a surface of a metal foil, and is dried, and then dried material is irradiated with laser to remove the layer of the binder attached, in a layer-forming manner, to the surface of the active substance, while maintaining the binder function of each particle. The document mentions an excimer laser as an example of this laser.

However, the techniques disclosed in JP 2008-205275 A and JP 2002-237434 A are not intended for improvement of the electrolyte impregnation capacity of an EDLC electrode film.

SUMMARY OF INVENTION

The present invention was made in view of the above-described problems of conventional techniques, and an object of the present invention is to provide a method for producing an activated carbon sheet having high electrolyte impregnation capacity and high mechanical strength, and a method for improving the electrolyte impregnation capacity of an activated carbon sheet while maintaining high mechanical strength of the activated carbon sheet.

The present invention relates to, for example, the following [1] to [6].

[1]

A method for producing an activated carbon sheet, the method comprising:

a sheet preparation step of preparing a sheet comprising an activated carbon, an electrically conductive carbon material, and a fibrous fluorocarbon resin binder, the fluorocarbon resin being polytetrafluoroethylene and/or modified polytetrafluoroethylene; and a light irradiation step of performing light irradiation of at least one side of the sheet such that the cumulative irradiation dose on the sheet surface is 50 to 1000 $mJ/cm^2$.

[2]

The method for producing an activated carbon sheet according to [1], wherein the light irradiation is ultraviolet irradiation by an excimer lamp in the presence of oxygen and/or ozone.

[3]

The method for producing an activated carbon sheet according to [1] or [2], wherein the activated carbon sheet is an electrode for an EDLC.

[4]

A method for improving the electrolyte impregnation capacity of an activated carbon sheet, the method comprising performing light irradiation of at least one side of an activated carbon sheet comprising an activated carbon, an electrically conductive carbon material, and a fibrous fluorocarbon resin binder, the fluorocarbon resin being PTFE and/or modified PTFE, such that the cumulative irradiation dose on the sheet surface is 50 to 1000 $mJ/cm^2$.

[5]

The method for improving the electrolyte impregnation capacity of an activated carbon sheet according to [4], wherein the light irradiation is ultraviolet irradiation by an excimer lamp in the presence of oxygen and/or ozone.

[6]

The method for improving the electrolyte impregnation capacity of an activated carbon sheet according to [4] or [5], wherein the activated carbon sheet is an electrode for an EDLC.

By the method for producing an activated carbon sheet according to the present invention, an activated carbon sheet having high electrolyte impregnation capacity and high mechanical strength can be produced.

In addition, by the method for improving the electrolyte impregnation capacity of an activated carbon sheet according to the present invention, the electrolyte impregnation capacity of an activated carbon sheet can be increased while the mechanical strength of the activated carbon sheet is maintained.

DETAILED DESCRIPTION OF THE INVENTION

The present invention is described below in more detail
[Method for Producing Activated Carbon Sheet]

The method for producing an activated carbon sheet according to the present invention comprises a sheet preparation step, and a light irradiation step which is carried out thereafter.

<Sheet Preparation Step>

In the sheet preparation step, a sheet comprising an activated carbon, an electrically conductive carbon material, and a fibrous fluorocarbon resin binder is prepared. Such a sheet can be produced by, for example, a sheet formation process in which a mixture comprising an activated carbon, an electrically conductive carbon material, and a fibrous fluorocarbon resin binder is shaped into a sheet while the fluorocarbon resin is fiberized.

The activated carbon, the electrically conductive carbon material, and the fluorocarbon resin binder may be those conventionally used for electrodes for electric double layer capacitors.

Examples of the activated carbon include commercially available products such as YP50F (manufactured by Kuraray Chemical Co., Ltd.) and Maxsorb (manufactured by Kansai Coke and Chemicals Co., Ltd.). The specific surface area of the activated carbon may be, for example, 1,000 to 2,500 $m^2/g$.

Examples of the electrically conductive carbon material include carbon black.

Examples of the carbon black include acetylene black, channel black, furnace black, and Ketjen Black. One of these may be used, or a combination of two or more of these may be used. Preferred examples of commercially available products of the carbon black include Continex CF (manufactured by Continental Carbon Company, conductive furnace black), Ketjen Black ECP600JD (Lion Corporation), Ketjen Black EC (manufactured by Ketjen Black International Company, conductive furnace black), Vulcan C (manufactured by Cabot Corporation, conductive furnace black), BLACK PEARLS 2000 (manufactured by Cabot Corporation, conductive furnace black), and DENKA acetylene black (manufactured by Denki Kagaku Kogyo Kabushiki Kaisha, acetylene black)

As the binder, polytetrafluoroethylene (PTFE) or a modified PTFE is used since it can be easily fiberized and has high capacity as a binder. Examples of the modified PTFE include modified PTFEs obtained by copolymerization of tetrafluoroethylene and a small amount (for example, not more than 0.5 mol %) of other kind(s) of monomers.

The binder may be in the form of, for example, grains. The binder can be easily fiberized by application of shear force during mixing with the other components or during rolling together with the other components.

Taking the total amount of the activated carbon, the electrically conductive carbon material, and the fluorocarbon resin binder as 100 parts by weight, the ratio of the activated carbon is, for example, not more than 98 parts by weight, preferably 55 to 90 parts by weight, more preferably 60 to 80 parts weight; the ratio of the electrically conductive carbon material is, for example, not less than 1 part by weight, preferably 5 to 30 parts by weight; and the ratio of the fluorocarbon resin binder is not less than 1 part by weight from the viewpoint of the strength of the activated carbon sheet (e.g., electrode film), and preferably 2 to 30 parts by weight, more preferably 5 to 15 part by weight from the viewpoint of improvement of the electrolyte impregnation capacity and improvement of the capacitance of the battery.

The above-described mixture can be prepared by mixing the activated carbon, the electrically conductive carbon material, and the binder by a conventionally known method.

When the components are mixed together, a molding aid may be further added to these components.

Examples of the molding aid include water; monohydric alcohols such as methanol and ethanol; and polyhydric alcohols such as ethylene glycol, propylene glycol, and glycerin. From the viewpoint of moldability, monohydric alcohols are preferred.

Taking the total amount of the activated carbon, the electrically conductive carbon material, and the fluorocarbon resin binder as 100 parts by weight, the amount of the molding aid is preferably not less than 80 parts by weight, more preferably 100 to 600 parts by weight. The molding aid is preferably removed by heating or the like when the mixture (kneaded mixture) is shaped into a sheet, or thereafter.

The method of rolling of the mixture (kneaded mixture) is not limited, and examples of the method include a method comprising preliminary shaping the kneaded mixture into a rod or a plate by a method such as extrusion or rolling, and further shaping the resulting product into a sheet by a method such as rolling using a pressure roll. In cases where a pressure roll is used for the shaping, the pressure roll temperature is preferably 20 to 100° C., more preferably 40 to 80° C.

In cases where the molding aid is removed by heating after the process of rolling of the mixture (kneaded mixture), the heating temperature is, for example, 100 to 200° C., and the heating time is, for example, 5 minutes to 5 hours.

The thickness of the sheet may be set appropriately depending on the use of the activated carbon sheet. For example, in cases where the use is an EDLC electrode film, the thickness may be about 0.05 to 1 mm.

<Light Irradiation Step>

In the light irradiation step, light irradiation of at least one side of the sheet prepared by the sheet preparation step is performed such that the cumulative irradiation dose on the sheet surface is 50 to 1000 $mJ/cm^2$. The light irradiation may also be carried out on both sides of the sheet.

The cumulative irradiation dose on the sheet surface is preferably 100 to 500 $mJ/cm^2$ from the viewpoint of increasing the electrolyte impregnation capacity of the sheet while suppressing a decrease in the mechanical strength of the sheet when the ratio of the amount of the fluorocarbon resin binder contained in the sheet is fixed.

Other preferred conditions for the light irradiation are as follows.

Irradiated light: ultraviolet light

Wavelength of irradiated light: 10 to 300 nm, more preferably 100 to 250 nm, still more preferably 150 to 200 nm Atmosphere during light irradiation: an inert gas (for example, rare gas such as helium gas or argon gas; or nitrogen gas) atmosphere or an atmosphere containing oxygen gas ($O_2$) and/or ozone gas, more preferably, an inert gas atmosphere containing oxygen gas ($O_2$) at not more than 20 vol % (preferably 0.01 to 10 vol %).

Examples of the light source for the light irradiation include excimer lamps, low pressure mercury lamps, YAG lasers, and excimer lasers. From the viewpoint of irradiation of abroad area on the sheet, excimer lamps and low pressure mercury lamps are preferred. Excimer lamps are more preferred because of their high efficiency, instant lighting, property to allow low-temperature treatment, low cost, and excellent maintenance property.

In cases where the cumulative irradiation dose on the sheet surface is lower than the range described above, the improvement of the electrolyte (especially, water and) impregnation capacity of the activated carbon sheet tends to be suppressed. In cases where the cumulative irradiation dose is higher than the range described above, the mechanical strength of the activated carbon sheet tends to be low.

During production of the activated carbon sheet containing PTFE (or modified PTFE) as a fluorocarbon resin binder, fiberization of the fluorocarbon resin binder proceeds in the sheet-like roll product comprising the raw material mixture, especially in the vicinity of its surface. It is thought that, as a result, the abundance ratio of the fluorocarbon resin binder fiber on the surface of the activated carbon sheet becomes relatively high, and water repellency on the surface of the activated carbon sheet becomes high; and that, in conventional EDLC electrode films, this process prevents penetration of electrolytes into the electrode film (in the activated carbon sheet).

In the activated carbon sheet of the present invention, it is assumed that the light irradiation causes cleavage of PTFE (including modified PTFE) molecules only in the vicinity of the surface of the activated carbon sheet (that is, the light irradiation causes destruction of the PTFE skin layer or partial cleavage of PTFE fibers), and that, in cases where the atmosphere during the light irradiation contains oxygen gas and/or ozone gas, active oxygen is generated from the oxygen gas and/or ozone gas, and this active oxygen gives a hydrophilic functional group containing oxygen (for example, hydroxyl group) onto the surface of the activated carbon sheet, thereby improving the impregnation capacity of the activated carbon sheet, while the activated carbon sheet maintains its mechanical strength since the PTFE molecules in the inner portion of the activated carbon sheet are not cleaved.

By the light irradiation step, the electrolyte impregnation capacity of the activated carbon sheet can be improved, while the mechanical strength of the activated carbon sheet is maintained.

Thus, the production method of the present invention enables production of an activated carbon sheet which exhibits, in a balanced manner, both excellent electrolyte (for example, an electrolyte for an EDLC) impregnation capacity and excellent mechanical strength.

In cases where an electrode sheet for an EDLC is produced as an activated carbon sheet by the production method according to the present invention, the electrolyte can be quickly absorbed when the electrode sheet is incorporated into the battery, so that the time required for the operation of the incorporation can be reduced in the battery production.

[Method for Improving Electrolyte Impregnation Capacity of Activated Carbon Sheet]

In the method for improving the electrolyte impregnation capacity of an activated carbon sheet according to the present invention, at least one side of an activated carbon sheet comprising an activated carbon, an electrically conductive carbon material, and a fibrous fluorocarbon resin binder selected from PTFE and modified PTFE is irradiated with light.

The activated carbon sheet can be produced by, for example the above-described sheet formation process. Details of the conditions for the light irradiation are the same as the conditions for the light irradiation in the above-described method for producing an activated carbon sheet.

By the method according to the present invention, the electrolyte impregnation capacity of an activated carbon sheet can be increased while the mechanical strength of the activated carbon sheet is highly maintained. More specifically, while the relative tensile strength defined by the equation described below is preferably not less than 90%, more preferably not less than 95%, the relative impregnation time defined by the equation below can be not more than 90%, more preferably not more than 60% in cases where the electrolyte described below is 1.0 M TEA-BF4/PC solution, an ionic liquid "IL-IM1" (their details are described in the Examples section), or water.

Relative tensile strength (%)=(tensile strength of irradiated sheet)/(tensile strength of non-irradiated sheet)

The value of the tensile strength is obtained by cutting an activated carbon sheet into a strip having a width of 10 mm and a length of 60 mm to prepare a test piece, and measuring the tensile strength value using a tensile testing machine (manufactured by Instron), or by an equivalent method.

Relative impregnation time (%)=(time required for impregnation of irradiated sheet with electrolyte)/(time required for impregnation of non-irradiated sheet with electrolyte)

The impregnation time is the time required for 9 μL of the electrolyte dropped at once onto the surface of the activated carbon sheet (the surface irradiated with light, in the case of the irradiated sheet) to penetrate into the sheet to an extent where the gloss on the sheet surface disappears (that is, to an extent where the electrolyte disappears from the sheet surface).

EXAMPLES

The present invention is described below in more detail by way of Examples. However, the present invention is not limited by these Examples.

<Measurement Methods>
(Impregnation Capacity)

Onto each of the sheets produced in the Production Example, Examples, and Comparative Example, 9 μL of an electrolyte was dropped at once using a dropper, and the time required for the electrolyte to penetrate into the sheet to an extent where the gloss on the sheet surface disappeared (that is, to an extent where the electrolyte disappeared from the sheet surface) (hereinafter referred to as "impregnation time") was measured, and the relative impregnation time defined by the following equation was determined.

Relative impregnation time (%)=(time required for impregnation of irradiated sheet in Example or Comparative Example)/(time required for impregnation of non-irradiated sheet in Example or Comparative Example)

Three kinds of electrolytes, that is, an organic electrolyte (trade name, "1.0 M TEA-BF4/PC"; manufactured by Toyo Gosei Co., Ltd.) (hereinafter referred to as "PC"), an ionic liquid (trade name, "IL-IM1"; manufactured by Koei Chemical Company, Limited) (hereinafter referred to as "EMI-BF4"), and water were used.

(Mechanical Strength)

Each of the sheets produced in the Production Example, Examples, and Comparative Example was cut into a strip having a width of 10 mm and a length of 60 mm to prepare a test piece, and the tensile strength of the test piece was measured using a tensile testing machine (manufactured by Instron), to determine the relative tensile strength defined by the equation below.

Relative tensile strength (%)=(tensile strength of irradiated sheet in Example or Comparative Example)/(tensile strength of non-irradiated sheet in Example or Comparative Example)

(Powder Falling Property)

By touching each of the sheets produced in the Examples and Comparative Example with a finger, evaluation was carried out according to the following standard.

∘: Powder hardly attached to the finger.

x: Powder attached to the finger to an extent where a black color was apparent

Production Example 1

80 parts by weight of activated carbon (mean particle size, 25 μm; coconut shell activated carbon), 15 parts by weight of conductive carbon black (manufactured by Ketjen Black International Company; Ketjen Black EC), and 5 parts by weight of PTFE (manufactured by Daikin Industries, Ltd.; POLYFLON D-1E) were mixed together, and to a total of 100 parts weight of the resulting mixture, 150 parts by weight of a molding aid (ethanol) was further added, followed by kneading the obtained mixture at 20° C. The resulting kneaded mixture was rolled to a thickness of 0.5 mm using a roll press at a roll surface temperature of 40° C. to obtain a sheet, and the sheet was then heated at 150° C. for 1 hour for drying.

Example 1

From the sheet obtained in Production Example 1, an A4-size sheet was cut out, and one side of the resulting sheet was irradiated with light using an excimer lamp. Detailed conditions for the light irradiation were as follows.

Distance from the light source (excimer lamp (manufactured by M. D. Excimer, Inc.; MEIRH-N-1-330)) to the sheet: 2 mm Irradiated light: ultraviolet light (wavelength, 155 to 195 nm (maximum, 170 nm))

Sheet moving speed: 1 m/minute

Atmosphere: mixed flow of 50 L/min. nitrogen gas and 3 L/min. air

Cumulative irradiation dose on the sheet surface: 130 mJ/cm$^2$

The results of evaluation of the irradiated sheet are shown in Table 1.

Example 2

The same operations as in Production Example 1 were carried out except that the amount of PTFE was changed to 15 parts by weight, and the amount of the activated carbon was changed to 70 parts by weight, to obtain a sheet. The same operations as in Example 1 were then carried out except that this sheet was used instead of the sheet obtained in Production Example 1. The results of evaluation of the irradiated sheet are shown in Table 1.

Example 3

The same operations as in Production Example 1 were carried out except that the amount of PTFE was changed to 30 parts by weight, and the amount of the activated carbon was changed to 55 parts by weight, to obtain a sheet. The same operations as in Example 1 were then carried out except that this sheet was used instead of the sheet obtained in Production Example 1. The results of evaluation of the irradiated sheet are shown in Table 1.

Example 4

The same operations as in Example 1 were carried out except that the cumulative irradiation dose was changed to 50 mJ/cm$^2$. The results of evaluation of the irradiated sheet are shown in Table 1.

Example 5

The same operations as in Example 1 were carried out except that the cumulative irradiation dose was changed to 1000 mJ/cm$^2$. The results of evaluation of the irradiated sheet are shown in Table 1.

Comparative Example 1

The same operations as in Example 1 were carried out except that the cumulative irradiation dose was changed to 1200 mJ/cm$^2$. The results of evaluation of the irradiated sheet are shown in Table 1.

TABLE 1

| Sheet | Cumulative irradiation dose (mJ/cm$^2$) | Relative impregnation time | | | Relative tensile strength | Powder falling |
|---|---|---|---|---|---|---|
| | | PC | IL-IM1 | Water | | |
| Production Example 1 | 0 | — | — | — | — | ∘ |
| Example 1 | 130 | 83% | 48% | 28% | 95% | ∘ |
| Example 2 | 130 | 90% | 70% | 50% | 95% | ∘ |
| Example 3 | 130 | 95% | 90% | 80% | 95% | ∘ |
| Example 4 | 50 | 89% | 80% | 72% | 98% | ∘ |
| Example 5 | 1000 | 51% | 40% | 26% | 92% | ∘ |
| Comparative Example 1 | 1200 | 47% | 38% | 24% | 86% | x |

The invention claimed is:

1. A method for producing an activated carbon sheet, said method comprising:
preparing a sheet comprising an activated carbon, an electrically conductive carbon material, and a fibrous fluorocarbon resin binder, wherein said fluorocarbon resin is at least one resin selected from the group consisting of polytetrafluoroethylene and a modified polytetrafluoroethylene obtained by copolymerization of tetrafluoroethylene and one or more other kind of monomer; and
performing light irradiation of at least one side of said sheet such that the cumulative irradiation dose on the sheet surface is 130 to 1000 mJ/cm$^2$.

2. The method for producing an activated carbon sheet according to claim 1, wherein said light irradiation is ultraviolet irradiation by an excimer lamp in the presence of oxygen gas and/or ozone gas.

3. The method for producing an activated carbon sheet according to claim 2, wherein said activated carbon sheet is an electrode for an electric double layer capacitor.

4. The method for producing an activated carbon sheet according to claim 1, wherein said activated carbon sheet is an electrode for an electric double layer capacitor.

5. The method for producing an activated carbon sheet according to claim 1, wherein said light irradiation is performed in the presence of oxygen gas and/or ozone gas.

6. The method for producing an activated carbon sheet according to claim 5, wherein said light irradiation is performed in the presence of oxygen gas.

7. A method for improving the electrolyte impregnation capacity of an activated carbon sheet, said method comprising:

performing light irradiation of at least one side of an activated carbon sheet comprising an activated carbon, an electrically conductive carbon material, and a fibrous fluorocarbon resin binder, said fluorocarbon resin is at least one resin selected from the group consisting of polytetrafluoroethylene and a modified polytetrafluoroethylene obtained by copolymerization of tetrafluoroethylene and one or more other kind of monomer, such that the cumulative irradiation dose on the sheet surface is 130 to 1000 mJ/cm$^2$.

8. The method for improving the electrolyte impregnation capacity of an activated carbon sheet according to claim 7, wherein said light irradiation is ultraviolet irradiation by an excimer lamp in the presence of oxygen gas and/or ozone gas.

9. The method for improving the electrolyte impregnation capacity of an activated carbon sheet according to claim 8, wherein said activated carbon sheet is an electrode for an electric double layer capacitor.

10. The method for improving the electrolyte impregnation capacity of an activated carbon sheet according to claim 7, wherein said activated carbon sheet is an electrode for an electric double layer capacitor.

11. The method for improving the electrolyte impregnation capacity of an activated carbon sheet according to claim 7, wherein said light irradiation is performed in the presence of oxygen gas and/or ozone gas.

12. The method for improving the electrolyte impregnation capacity of an activated carbon sheet according to claim 11, wherein said light irradiation is performed in the presence of oxygen gas.

* * * * *